United States Patent
van der Mark et al.

(10) Patent No.: US 9,117,269 B2
(45) Date of Patent: Aug. 25, 2015

(54) METHOD FOR RECOGNIZING OBJECTS IN A SET OF IMAGES RECORDED BY ONE OR MORE CAMERAS

(75) Inventors: Wannes van der Mark, Leiden (NL); Peter Tettelaar, The Hague (NL); Richard Jacobus Maria den Hollander, The Hague (NL)

(73) Assignee: NEDERLANDSE ORGANISATIE VOOR TOEGEPAST-NATUURWETENSCHAPPELIJK ONDERZOEK TNO, Delft (NL)

( * ) Notice: Subject to any disclaimer, the term of this patent is extended or adjusted under 35 U.S.C. 154(b) by 326 days.

(21) Appl. No.: 13/132,007

(22) PCT Filed: Dec. 1, 2009

(86) PCT No.: PCT/NL2009/050728
§ 371 (c)(1),
(2), (4) Date: Aug. 10, 2011

(87) PCT Pub. No.: WO2010/064907
PCT Pub. Date: Jun. 10, 2010

(65) Prior Publication Data
US 2011/0293142 A1 Dec. 1, 2011

(30) Foreign Application Priority Data
Dec. 1, 2008 (EP) .................................... 08170358

(51) Int. Cl.
*G06K 9/00* (2006.01)
*G06T 7/00* (2006.01)

(52) U.S. Cl.
CPC ..... *G06T 7/0028* (2013.01); *G06T 2207/10021* (2013.01)

(58) Field of Classification Search
CPC ...... G01S 17/895; G06T 17/05; G06T 7/0038
See application file for complete search history.

(56) References Cited

U.S. PATENT DOCUMENTS

| 3,435,743 | A | * | 4/1969 | Craig | ............................... 396/10 |
| 4,164,740 | A | * | 8/1979 | Constant | ..................... 342/25 A |
| 5,379,133 | A | * | 1/1995 | Kirk | ................................ 359/15 |

(Continued)

FOREIGN PATENT DOCUMENTS

WO     2004029878 A1     4/2004

OTHER PUBLICATIONS

Joshi, Neel et al: "Synthetic Aperture Tracking: Tracking through Occlusions" Computer Vision, 2007. ICCV 2007. IEEE 11th International Conference On, IEEE, PI, Oct. 1, 2007, pp. 1-8.

(Continued)

*Primary Examiner* — Tsung-Yin Tsai
(74) *Attorney, Agent, or Firm* — Lucas & Mercanti, LLP

(57) ABSTRACT

Method for improving the visibly of objects and recognizing objects in a set of images recorded by one or more cameras, the images of said set of images being made from mutual different geometric positions, the method comprising the steps or recording a set or subset of images by means of one camera which is moved rather freely and which makes said images during its movement, thus providing an array of subsequent images, estimating the camera movement between subsequent image recordings, also called ego-motion hereinafter, based on features of those recorded images, registering the camera images using a synthetic aperture method, recognizing said objects.

19 Claims, 8 Drawing Sheets

(56) References Cited

U.S. PATENT DOCUMENTS

| | | | | |
|---|---|---|---|---|
| 5,488,373 | A | * | 1/1996 | Hellsten ................... 342/25 D |
| 5,546,084 | A | * | 8/1996 | Hindman ................... 342/25 F |
| 5,615,675 | A | * | 4/1997 | O'Donnell et al. .......... 600/425 |
| 5,801,970 | A | * | 9/1998 | Rowland et al. .................. 703/6 |
| 5,890,808 | A | * | 4/1999 | Neff et al. ................... 382/209 |
| 5,953,452 | A | * | 9/1999 | Boone et al. ................ 382/199 |
| 6,081,577 | A | * | 6/2000 | Webber .......................... 378/23 |
| 6,466,156 | B1 | * | 10/2002 | Ulander ..................... 342/25 R |
| 7,663,105 | B2 | * | 2/2010 | Hoctor et al. .............. 250/336.1 |
| 2008/0074494 | A1 | * | 3/2008 | Nemethy et al. ............. 348/143 |
| 2009/0297058 | A1 | * | 12/2009 | Hoctor et al. ................ 382/274 |
| 2013/0088489 | A1 | * | 4/2013 | Schmeitz et al. ............. 345/419 |

OTHER PUBLICATIONS

Vaish, Vaibhav et al: "Synthetic Aperture Focusing using a Shear-Warp Factorization of the Viewing Transform." Computer Vision and Pattern Recognition, 2005 IEEE Computer Society Conference On, IEEE Piscataway, NJ, USA, Jun. 25, 2005, p. 129.

Sankaranarayanan, Aswin C. et al: "Object Detection, Tracking and Recognition for Multiple Smart Cameras" Proceedings of the 2005 IEEE, IEEE. New York, USA, vol. 69, No. 10, Oct. 1, 2008, pp. 1606-1624.

* cited by examiner

LEFT IMAGE BEFORE MOTION    LEFT IMAGE AFTER MOTION

METHOD FOR RECOGNIZING OBJECTS IN A SET OF IMAGES RECORDED BY ONE OR MORE CAMERAS

CROSS-REFERENCE TO RELATED APPLICATIONS

This application is a 371 of PCT/NL2009/050728 filed Dec. 1, 2009, which claims the benefit of European Patent Application No. 08170358.9 filed Dec. 1, 2008, the contents of each of which are incorporated herein by reference.

FIELD OF THE INVENTION

The invention refers to a method and a system for improving the visibility of objects and recognizing objects in a set of images recorded by one or more cameras.

BACKGROUND

It is challenging to obtain visual situational awareness of objects and people that are partially occluded. These occlusions may be the result of branches, dense foliage or other objects. In most of these cases different parts of the occluded object or person can be observed by moving the camera from one position to the other. However, by moving the camera around parts that were visible in earlier positions of the camera will be lost. The lack of a complete and easily interpretable image makes it more difficult or even impossible to automatically detect objects like vehicles or recognize human faces.

To deal with these kind of challenges state-of-the-art computer vision research focuses on camera arrays (typically>60 cameras). The results are very promising; however, the camera arrays developed thus far have large physical dimensions.
Synthetic Aperture (Sa) Imaging in General Large aperture cameras typically have a small depth of field, meaning that there is a reasonably small depth range at which objects are imaged sharply. Scene objects that are out of focus are blurred across the image. This effect increases with increasing aperture sizes. In order to use this effect to the extent of "removing" out-of-focus objects, a very large aperture is needed. Fortunately, this is possible by creating a synthetic aperture (SA) which may be constituted by a (e.g. matrix) array of cooperating cameras, as illustrated in FIG. 1. A synthetic aperture method creates a synthesized output image from the images of the cameras by means of a process of registration, the synthesized output image corresponding to an image of a virtual camera with a larger aperture size than those of the cooperating cameras. A synthesized output image of a synthetic aperture method typically has a more limited depth of focus than the images of the cooperating cameras, at a selectable focus distance from the virtual camera.

The array of cameras forms an imaging system having a large aperture. A single point on the chosen virtual focal plane is projected to different image plane positions in the cameras. The camera images have to be co-registered in order to map these positions to the same point. The average of all the camera images then forms the output image.

A partial occluding object before the focal plane will not be projected sharply on the image plane; different occluding parts are projected to the same point. As some cameras can see the scene point through the occlusion, the resulting image point is made from one or more scene points plus varying occluding object points. As a result, the scene point will dominate in the output image. FIG. 1 illustrates the creation of an SA by the use of multiple cameras (image taken from [1]).

The camera images are combined in such a way that scene points from the focal plane are projected to the same positions in the output image. A partial occluding object that is positioned before the focal plane appears blurred in the output image.
Synthetic Aperture Imaging Using a Camera Array In order to determine which image pixels belong to certain focal plane positions, a registration procedure is required. In general, one of the cameras is chosen as reference view to which all other views are registered. A proven method for registration is to place a calibration target at the desired focal plane position, and determine where the plate positions appear in the camera images. The cameras will then be calibrated for a fixed focal plane position. For each camera a projective transformation (homograph) is calculated, that maps the camera view to the chosen reference view. The camera images can then be transformed and averaged to form the output image.

It is possible to set the focal plane to a different position by shifting the images with an amount proportional to their mutual distances. In FIG. 2 can be seen that the focal plane position depends on the camera spacings when the mappings of the views remains fixed. Changing these spacings amounts to changing the depth of the focal plane. However, instead of changing the camera spacings, the view mappings can also be shifted [3]. This is the easiest way for varying the focal plane distance. FIG. 2 illustrates that changing the focal plane position for a camera array is equivalent to changing mutual camera spacings under fixed image shifts. In practice, the camera array can remain fixed while the camera images are shifted instead.

When the focal plane position is varied in this way, it is possible to "step" through a recorded image set and visualize all scene elements at specific distances. An example is given in FIG. 4 for the input images from FIG. 3. Here, a camera is looking at a bush behind which a person is hiding. Due to the occlusion of the bush, the person is not visible in any of the example input images of FIG. 3. However, SA images can be constructed from the input imagery, using different focal plane distances. For example, the focal plane position selected for image at top right in FIG. 4, leads to an image that is only sharp for the distance at which the checkerboard object was placed. Furthermore, the focal plane position selected for image at bottom left in FIG. 4 reveals that a person is hiding behind the bush. Synthetic aperture techniques can therefore be used to improve the visibility of objects that are hidden behind partial occlusions.

Prior-art SA techniques require large camera array's. State-of-the-art camera array's systems typically use>60 cameras. For example, the Stanford camera array consists out of 88 cameras [1]. Although the results are very promising, the large physical dimensions are disadvantageous for several applications, e.g. in airplanes etc.

SUMMARY

One aim is to enable the use of only a very limited number of cameras to create a set of images which forms the basis of improving the visibility and recognition of partially occluded objects.

Another aim is to provide a system having much smaller dimensions than prior art systems.

According to one aspect a method according to claim 1 is provided. Herein images are recorded, the images being obtained from mutually different geometric positions, the method comprising the following steps:

recording a set of images by means of a camera which is freely moved and which makes said images during its movement, thus providing an array of successive images;

estimating the camera movement between successive image recordings based on features of those recorded images;

registering the camera images using a synthetic aperture method.

In addition to images from the camera, images from other cameras may similarly be used, but a single camera or a small number of cameras may suffice. A stereo camera may be used for example. The synthetic aperture method provides for mutual registration of positions from different ones of the images that map to corresponding 3D positions and fusion of image values from the images for the registered positions. The focal plane that is defined by the mapping may be set to different positions by shifting the images with an amount proportional to the mutual distances between the positions.

According to one aspect a device according to claim 5 is provided. The device comprises
 a camera for recording a set of images,
 a controller configured to actuate said camera to record the images of said set of images from mutual different geometric positions during movements of the device, thus providing an array of successive images;
 a motion estimator or a connection to a motion estimator arranged to estimate the camera movements between the recorded successive images based on features of those recorded successive images;
 a synthetic aperture processor arranged to process the camera images by means of a synthetic aperture method to register the images.

Due to the smaller dimensions it is possible to implement the technique in e.g. a hand-held device. An example embodiment is a binocular with an image processing system. A user can record images with the binoculars of an object that is hidden behind a partial occlusion such as foliage or branches of a bush. The image processing system then uses the technique to enhance the visibility of the hidden object. This result can be displayed to the user or processed further. Yet another aim is to provide a system which performs better than prior art systems. This is possible because the technique can work with an arbitrary number of images recorded at arbitrary positions and orientations in three dimensional (3-D) spaces instead of a set of images recorded with a fixed number of cameras positioned at fixed locations.

BRIEF DESCRIPTION OF THE DRAWING

These and other objects and advantageous aspects will become apparent from a description of exemplary embodiments using the following figures

SYNTHETIC APERTURE IMAGING USING A MOVING CAMERA

Figure 1:
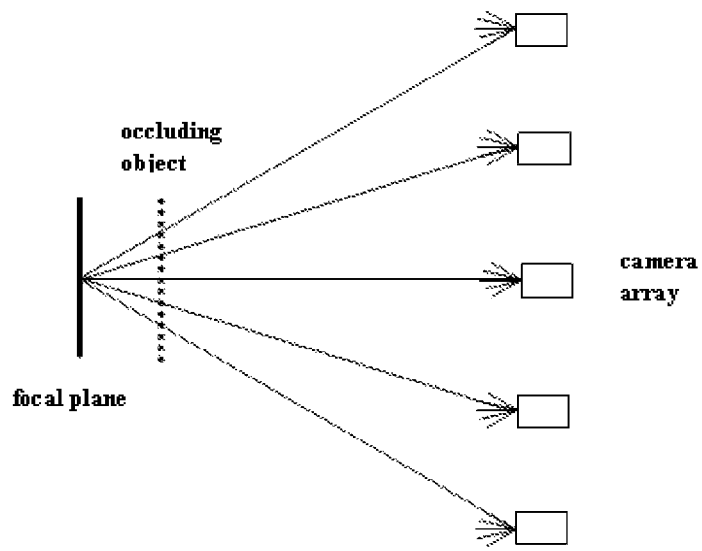
FIG. 1 illustrates a matrix array of cooperating cameras
Figure 2:
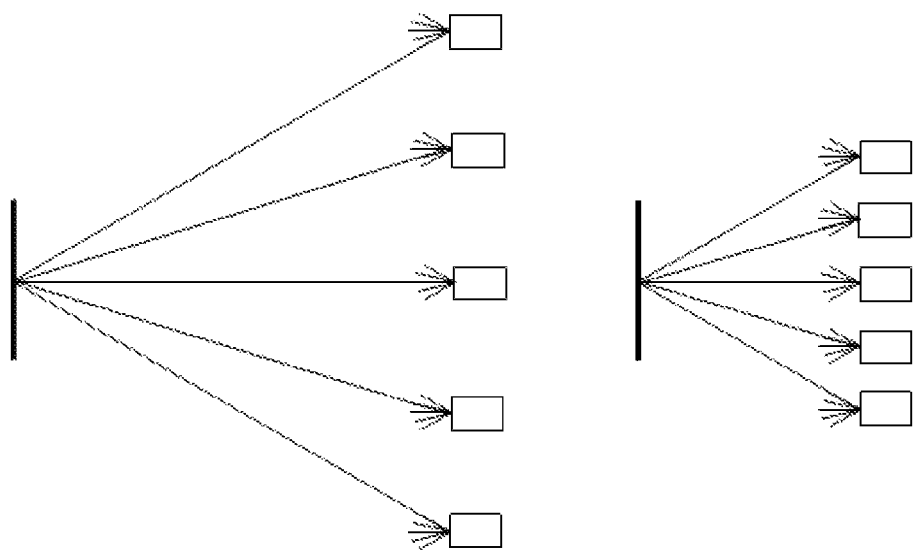
FIG. 2 illustrates the relation between focal plane position and camera spacing
Figure 3:
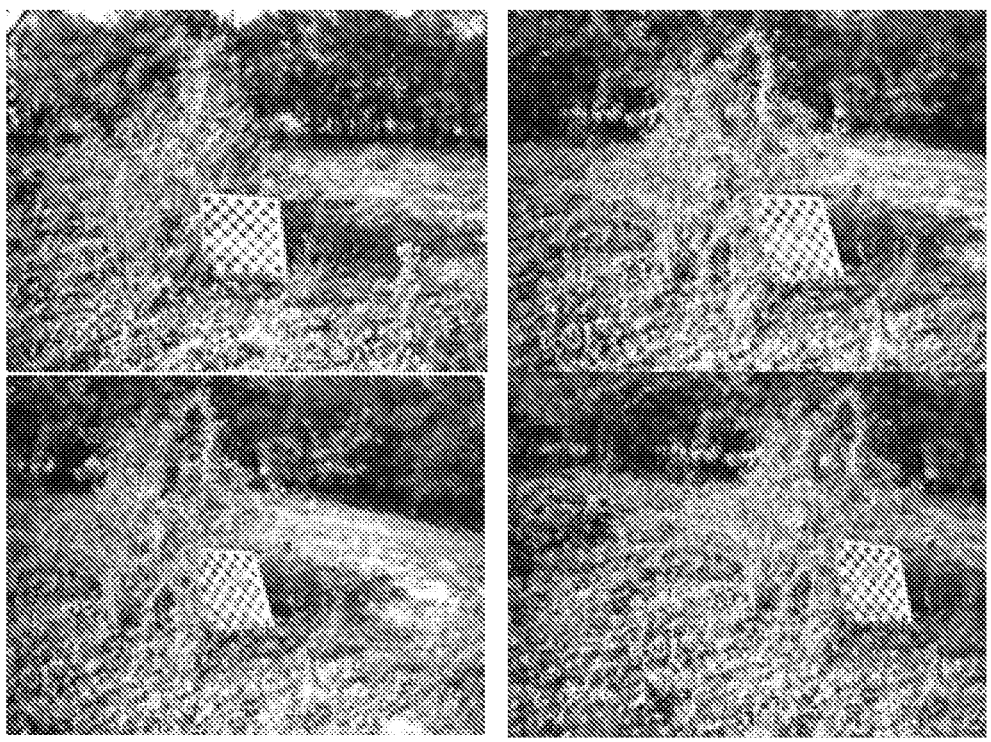
FIG. 3 shows input images
Figure 4:
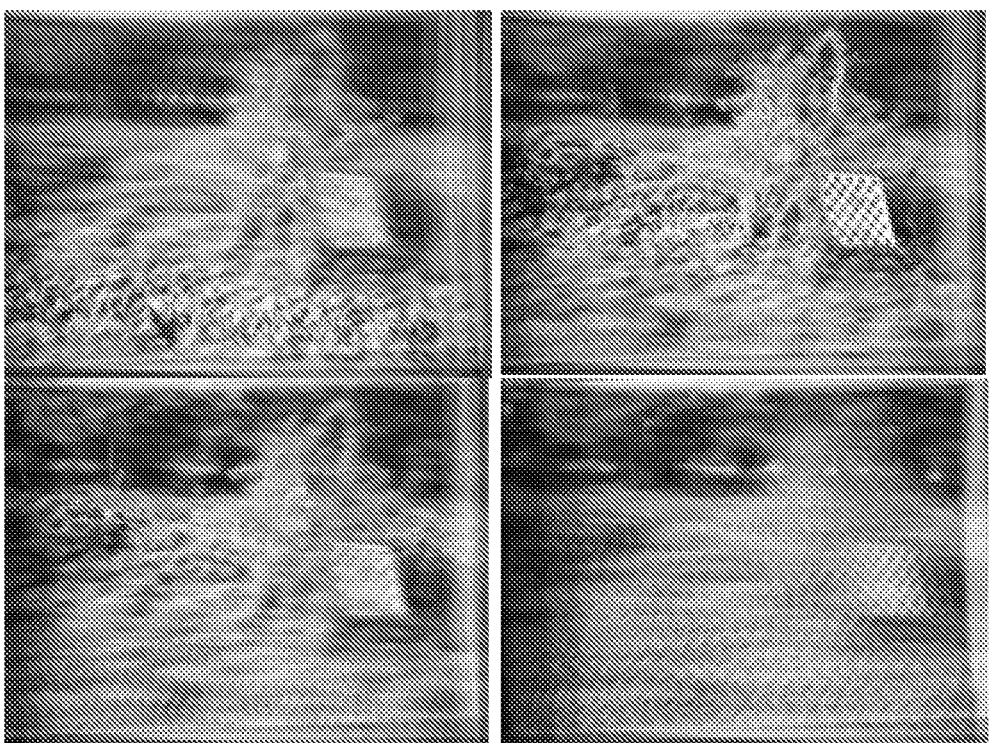
FIG. 4 shows visualization of scene elements at specific distances
Figure 5:
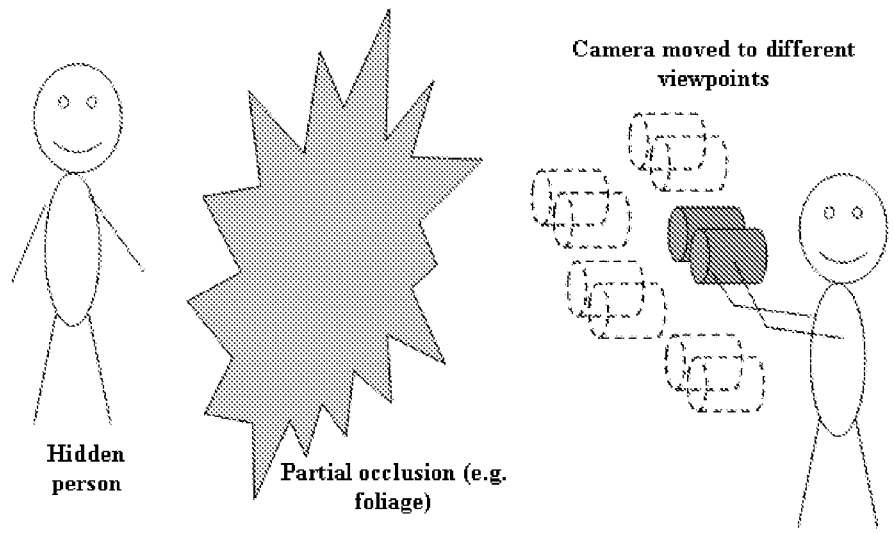
FIG. 5 shows use of a binocular with an image processing system

A method is provided that may be used for recognizing objects in a set of images recorded by one or more cameras, the images of said set of images being made from mutual different geometric positions, which method will be illustrated in detail hereinafter. FIG. 5 shows an example embodiment of an application to a binocular with an image processing system.

Figure 6:
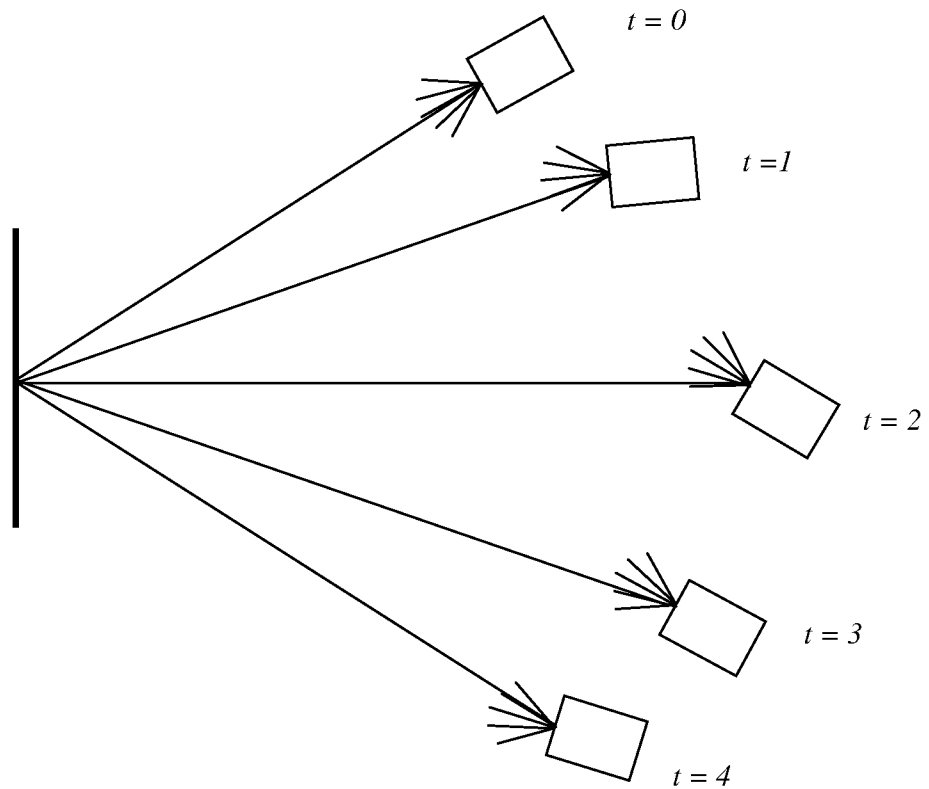
FIG. 6 illustrates use of multiple images of a single camera

In contrast to a fixed setup of multiple cameras, applicant investigated the possibility of using multiple images of a single (e.g. stereo) camera, see FIG. 6. The advantage is that instead of a plurality of cameras, only one camera (or only a very restricted number of cameras) is required, which camera is moved rather freely and which makes pictures (images) during its movement, thus providing an array of images, which can be processed in about the same way as the images which result from a prior-art's fixed array of camera's.

The challenge is to accurately compute the free camera movement (called ego-motion hereinafter) between recordings based on the images. This is necessary in order to know where the focal plane points are projected onto the image planes. In general, ego-motion can be computed more reliably for a stereo camera than for a single camera, so preferably a stereo camera will be used for this purpose, although a mono camera can be used as well.

After the ego-motion estimation, the projected positions of the focal plane points are known and an SA technique can be applied. FIG. 6 illustrates applicant's new approach of a moving camera for SA imaging. The indicated camera positions belong to different time instants.

Before applying the synthetic aperture techniques to a moving camera, the motion of the camera should be estimated. Subsequently, the camera images can be registered using a variant of the synthetic aperture method. Next section starts with a description of the ego-motion estimation used to determine the motion of the camera; in the subsequent section the synthetic aperture algorithm is described.

Ego-motion Estimation

Figure 7:
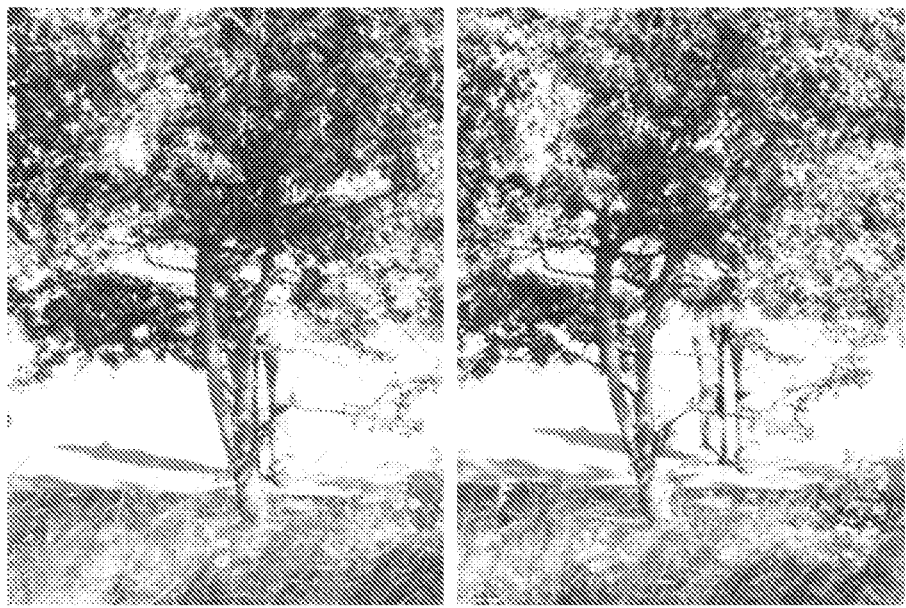
FIG. 7 shows an image of an outdoor scene before and after camera ego-motion

Ego-motion changes the viewpoint of a (stereo)-camera. FIG. 7 shows an image of an outdoor scene before and after camera ego-motion. Objects visible in both images show a small displacement due to the camera motion. The camera's 3-D ego-motion is estimated based on the two-dimensional (2-D) points that are tracked and matched between the stereo images. FIG. 7 shows example images recorded before and after camera ego-motion.

Feature Detection and Matching

In the following, bold symbols denote both denote vectors and matrices.

The first step is to find distinctive points that are visible in multiple images. An example method to find such distinctive points is the Scale-Invariant Feature Transform (SIFT) [10]. SIFT descriptors are vectors that encode a small image region. They have the advantage that they are invariant to scale, rotation and translation. Hence, they are very useful for matching image points when the camera has moved. Furthermore, they eliminate the need to add artificial markers to the scene or mark image points by hand.

Figure 8:
FIG. 8 shows stereo matches between image points

The SIFT descriptors are used to establish two types of relationships between the images. The first one is between the left and right stereo images. Descriptors in one image are compared to descriptors in the other image. Initial matches are established by finding for each descriptor its most similar counterpart in the other image. Dissimilarity between two descriptors (i.e. vectors) is determined by their Euclidean distance. A small distance implies a large similarity. Final matches are selected from the additional requirement that matches have to be geometrically consistent. For the left and right image from a stereo pair, the search area is limited to only single image lines due to the constraints imposed by the epipolar geometry [2] of the stereo rig. Here, the lens distortion is taken into account. The lens distortion is established from a stereo camera calibration procedure before recording. Note that calibration has to be done only once. FIG. 8 illustrates resulting stereo matches.

Figure 9:
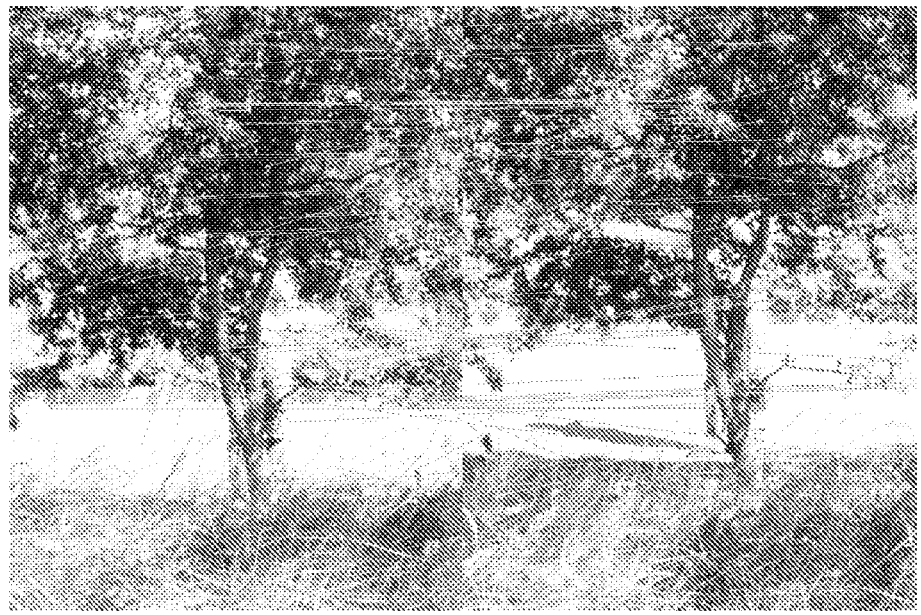
FIG. 9 shows matched descriptors

The second type of matching involves tracking features over time through the stereo image sequence. This sequential matching establishes points in the left and right image of the previous stereo frame and of the current stereo frame, as illustrated in FIG. 9. Again, the matches are required to be geometrically consistent. The sequentially matched image points are needed to determine the camera's trajectory through the 3-D space. FIG. 9 shows matched descriptors from left to right in the stereo frame and from the previous stereo frame to the current frame. It is also possible to use other types of feature detectors [15] or matching strategies [16] to obtain the feature correspondences.

Stereo Reconstruction

Figure 10:
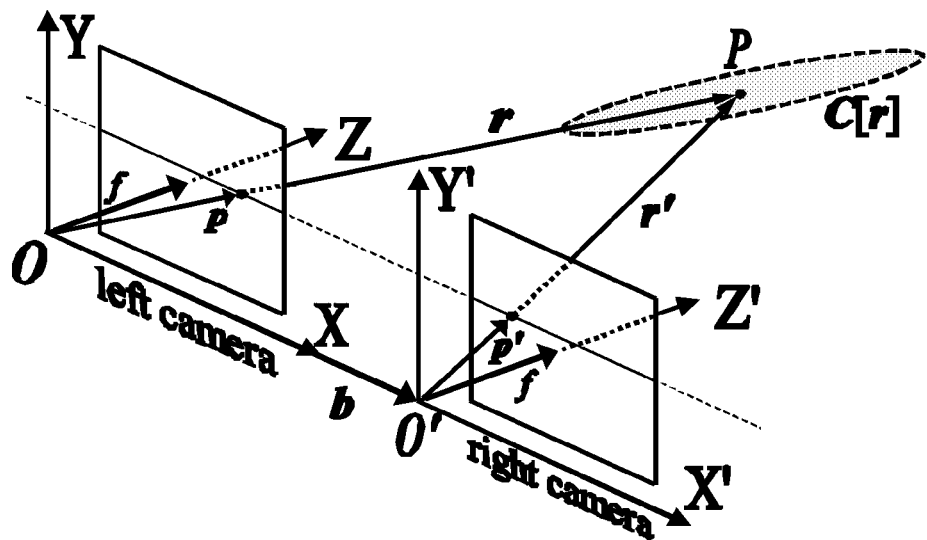
FIG. 10 illustrates the geometry of a rectified stereo camera

Stereo reconstruction is used to recover the 3-D positions from the 2-D image SIFT feature positions. It is assumed that the stereo images have been rectified, which means that both camera image planes are coplanar and are only separated by a translation along the X-axis. Furthermore, it is assumed that the camera projection is modelled by the normalized pin-hole model. Therefore, the focal length f of both cameras is equal to 1.0. However, other properties such as lens distortion and the magnitude of physical camera properties such as focal length and pixel size do play an important role in the formation of real camera images. Images taken with a normal camera can be transformed in such a way that the projection equals that of the normalized pin-hole model. This transformation requires a set of camera parameters that can be obtained from the calibration procedure. FIG. 10 illustrates the geometry of a rectified stereo camera. The covariance C[r] of the stereo reconstructed point P is illustrated by an ellipsoid.

In FIG. 10 a rectified stereo pair is shown that observes a 3-D point P. In the left camera reference frame the point is indicated by vector r. The same point is also indicated by vector r' in the right camera reference frame. Due to image projection, there are also two image points indicated by vectors p and p'. Only a horizontal disparity value d separates both vectors:

$$p' = \begin{pmatrix} x' \\ y' \\ 1 \end{pmatrix} = \begin{pmatrix} x-d \\ y \\ 1 \end{pmatrix} \text{ and } p = \begin{pmatrix} x \\ y \\ 1 \end{pmatrix} \quad (3)$$

Here, the scalars x and y are the horizontal and vertical image positions of the SIFT features. A problem is that these values cannot be measured precisely due to influences such as noise. Kanatani [8] shows that the feature locations can be optimally corrected to the epi-polar lines when the image noise is homogenous and isotropic distributed:

$$\hat{y} = \hat{y}' = \frac{1}{2}[y + y'] \quad (4)$$

Now, in order to reconstruct 3-D vector r or r', the scalar difference has to be estimated from the disparity d and the camera baseline distance b:

$$r = \alpha \hat{p} \text{ and } r' = \alpha \hat{p}' \text{ with } \alpha = \frac{b}{d} \quad (5)$$

As indicated before, the disparity between p and p' cannot be estimated precisely. Errors in the disparity will have consequences for the precision of r. To obtain a measure for reconstruction uncertainty we use the method developed by Kanatani [8] for stereo reconstruction. He proposes the following formula to calculate the error propagation of the squared error $$\sigma^2 = \frac{1}{2}(y - y')^2$$

into the covariance matrix C[r] of the vector r:

$$C[r] = \frac{\alpha^2 \sigma^2}{2} \left( P_z + \frac{4}{d^2} vv^\top \right), \quad v = \frac{1}{2}\hat{p} + \hat{p}' \quad (6)$$

The matrix $P_z$ is equal to the identity matrix with the exception that $P_z(3,3) = 0$.

A characteristic of the resulting covariances $C[r_i]$ for multiple points is that they indicate that the error distributions are highly anisotropic and inhomogeneous. Specifically, points located nearby the camera will have smaller errors than point that are located further away. Furthermore, as can be seen in FIG. 10, the errors in the distance (Z) direction are significantly larger than those in the other directions.

Alternative approaches for reconstructing the 3-D point positions and their covariance's from stereo image point correspondences could also be used. Examples are the method proposed by Matthies and Shafer [14] or the bootstrap method by Matei [9].

Ego-motion

Often, ego-motion is estimated with a Least-Squares (LS) approach that tries to optimize the Euclidean distance between the 3-D points. However, this distance measure is only optimal if the errors are isotropic and homogeneously distributed. Because we can obtain the 3-D point error covariance, the more appropriate Mahalanobis distance can be applied to estimate the rotation matrix R and translation vector t that minimize the residual $$J = \sum_{i=1}^{N} (r - \hat{r}_i) \cdot C[r_i]^{-1} (r_i - \hat{r}_i) + (s_i - \hat{s}_i) \cdot C[s_i]^{-1} (s_i - \hat{s}_i) \quad (7)$$

with $$\hat{s}_i = R\hat{r}_i + t.$$

Figure 11:
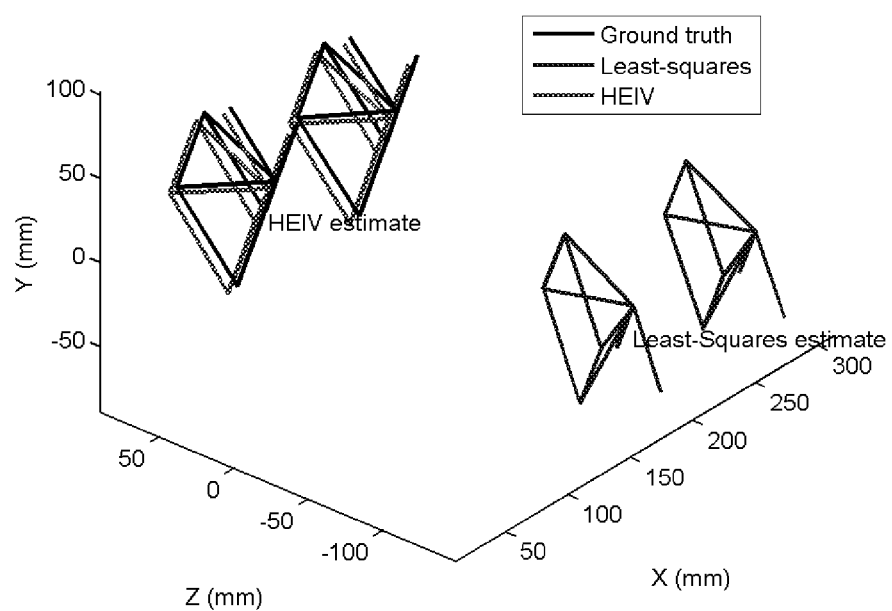
FIG. 11 shows an example comparison of LS and HEIV

This is achieved by applying the Heteroscedastic Error-In-Variables (HEIV) estimator as developed by Matei [9]. An example comparison of LS and HEIV is shown in FIG. 11. For this experiment, simulated stereo image data with added noise was used. It can be seen that more accurate results are achieved with the HEIV estimator. FIG. 11 illustrates a comparison between LS and HEIV ego-motion estimation based on stereo data.

Robust Ego-Motion Estimation

Despite its accuracy, the HEIV estimator is still sensitive to outlier points. These points can be caused by mismatches between the SIFT points or features tracked on independently moving objects.

In order to cope with this problem the HEIV estimator is embedded in a robust estimation technique. An example the robust Least-Median-of-Squares technique (LmedS) [11]. This technique works by first creating a number of small subsets that contain a random selection from the set of stereo reconstructed points. If the number of subsets is sufficiently high, there will be sets without outliers. An ego-motion estimate is obtained for every subset with the HEIV estimator. This leads to a number of different ego-motion solutions. Each solution is evaluated with the whole data set. The ego-motion that fits the most points is selected as the best solution. Points that do not fit this solution are identified as outliers and are discarded.

A drawback of LmedS or similar approaches, such as Random Sample Consensus (RANSAC) [12], is that every subset ego-motion estimate has to be evaluated with all points in order to determine its quality. This can be very computationally expensive when many points and/or subsets are used to compute the robust ego-motion. Recently, a novel approach, called EM-SE(3) was developed by Dubbelman et al. [13]. Like the previously described approach, stereo-vision is used to generate a number of minimal-set motion hypotheses. However, expectation maximization is used instead to discard outlier minimal-set hypothesis. This is made possible by the ability of computing an accurate weighted mean motion over a local linearization of the rigid-body motion group SE(3) by using Riemannian geometry. At the same time a robust mean motion as well as its associated uncertainty can be computed on the selected inlier motion hypothesis. Because this technique works directly with the motion hypothesis it is more efficient and scales better than conventional approaches, such as LmedS or RANSAC, if the number of landmarks is increased. The EM-SE(3) method is therefore preferable as a robust ego-motion estimation technique.

Synthetic Aperture Algorithm for a Freely Moving Camera

In the following, bold symbols denote vectors and non-bold capitals denote matrices.

With the ego-motion results, the camera rotations and translations of all camera positions w.r.t. a reference camera position are known. In particular, camera position i is rotated with $R_i$ and translated by $t_i$ w.r.t. the reference position. This reference position is simply one fixed position from the set of all camera positions. From the relative motions, the 3×4 camera matrices $P_i$ can be determined by $$P_i = KR_i^T[I - t_i]$$

where K is a 3×3 upper-triangular matrix containing the internal camera parameters and I is the 3×3 identity matrix [2]. The camera matrix is used to compute the projection of a 3-D point X to its image coordinates x by $$x = PX$$

where X and x are both homogeneous vectors.

Figure 12:
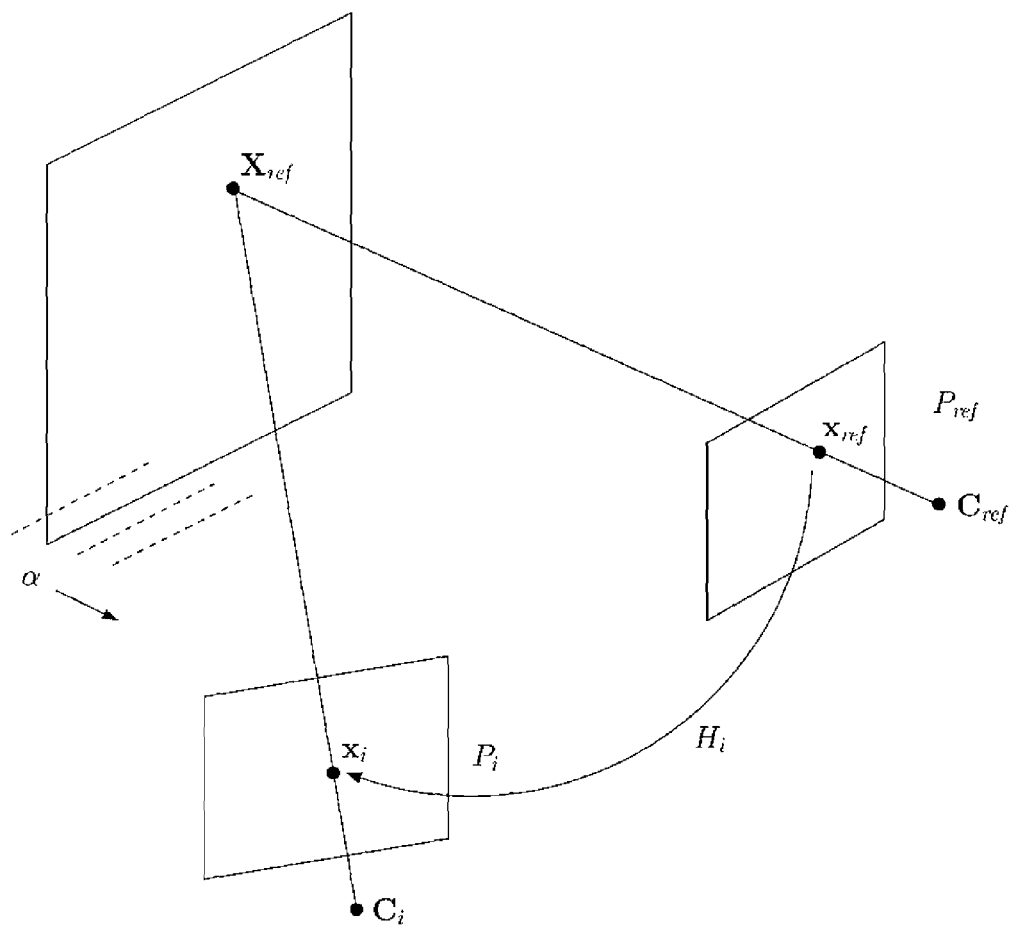
FIG. 12 shows a virtual focal plane and two different camera positions

The chosen reference camera position has camera matrix $P_{ref}$ which contains zero translation and the identity rotation, i.e. $P_{ref} = K[I \ 0]$. In other words, the world coordinate frame is chosen to be aligned with the reference camera frame. For an illustration of the configuration, see FIG. 12, showing a schematic drawing of a virtual focal plane and two different camera positions. The reference camera view is indicated by $P_{ref}$. One of the other views in the series is indicated by $P_i$. Points on the plane are indicated by $X_{ref}$, which implies the mapping $H_i$ between the images.

The reference camera center follows as $C_{ref} = (0 \ 0 \ 0 \ 1)^T$, which is a homogeneous vector in 3-D. Image points $x_{ref}$ (homogeneous vectors in 2D) from the reference view can be back-projected to rays in 3-D by $$X_{ref}(\alpha) = P_{ref}^+ x_{ref} + \alpha C_{ref}$$

where $\alpha$ is the ray parameter and $P_{ref}^+$ is the pseudo-inverse of $P_{ref}$. The pseudo-inverse equals $$P_{ref}^+ = \begin{bmatrix} K^{-1} \\ 0^T \end{bmatrix}$$

so that it can be written in the form $$\begin{bmatrix} \bullet & \bullet & \bullet \\ 0 & \bullet & \bullet \\ 0 & 0 & 1 \\ 0 & 0 & 0 \end{bmatrix}$$

since $K^{-1}$ is an upper-triangular matrix.

Now we choose all points $X_{ref}$ on a specific focal plane that is parallel to the image plane of $P_{ref}$. Note that this is similar to fixing $\alpha$, since we can write $X_{ref} = (\bullet \ \bullet \ 1 \ \alpha)^T$ and thus all Z-coordinates are identical; in the chosen world frame this means that the focal plane is fronto-parallel. We introduce the notation $$M_{ref} = P_{ref}^+ + \begin{bmatrix} 0 & 0 & 0 \\ 0 & 0 & 0 \\ 0 & 0 & 0 \\ 0 & 0 & \alpha \end{bmatrix}$$

so that $X_{ref}(\alpha) = M_{ref} x_{ref}$. The projections of the points $X_{ref}$ onto the other images are then calculated by $$x_i = P_i X_{ref}(\alpha) = P_i M_{ref} x_{ref} = H_i x_{ref}$$

where $P_i$ is the camera matrix for image i and $H_i = P_i M_{ref}$ is the resulting homograph from the reference image to image i.

With the homographic mappings known, all images can be registered w.r.t. the reference view. Then, the images can be fused to form the SA image for this particular focal plane. The fusing process can be computing the average pixel intensity or colour values, for each pixel in the reference view, based on intensity or colour values from pixels in the registered images. This step can also be performed by using robust measures, such as computing the median, or by statistical modelling of the intensity or colour distributions.

In order to choose an arbitrary 3-D focal surface, the parameter $\alpha$ should vary for different points $x_{ref}$. Therefore, a look-up table should be made that relates points $x_{ref}$ in the reference view to all other image points $x_i$.

Because the method can fuse images from arbitrary camera positions and orientations, new images can be added by moving the (stereo) camera to other positions and orientations.

Also, images can be removed by simply discarding them or selecting another reference view. Adding and discarding images can be done based on user preference. It can also be performed automatically using image quality measures [17]. For example, the sharpness of image features, such as edges in the intensity pixel values, can be used to improve the fused result by adding or removing images.

Figure 13:
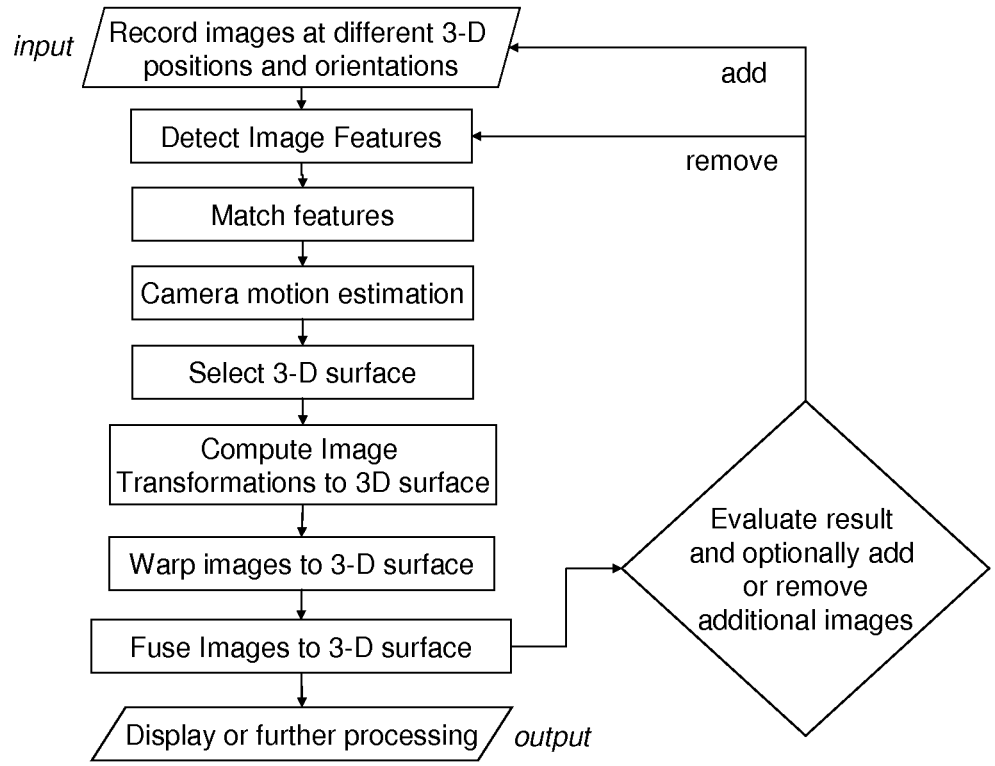
FIG. 13 shows a flow-chart of a process for recognizing objects

FIG. 13 illustrates the whole process as outlined above, in the form of a flow diagram. In a first step images are recorded different 3D positions and camera orientations. In a second step image features are detected in the images. In a third step image features in different ones of the images are matched to each other. In a fourth step camera motion is estimated. In fifth step a 3-D surface is selected. In a sixth step image transformations to the 3D surface are computed. In a seventh step images are warped to the 3D surface. In an eight step images are fused to the 3D surface. In a ninth step the result is evaluated and optionally images are removed, returning to the second step or additional images are added, returning to the first step. The results may be displayed or used for further processing. Display or further processing may be performed after the evaluation of the result indicates that no images need to be removed or added, or intermediate results may be used for display or further processing, the display or further processing being used in the evaluation.

An object recognition operation may be applied to warped and fused image data on the 3D surface. Object recognition may comprise template matching, feature detection, feature template matching, histogram comparison, geometric analyis etc. applied to the warped and fused image data. Template matching may comprise comparing the warped and fused image data to template image data and using a measure of the difference to form a decision on recognition. Feature detection may comprise applying one or more predetermined types of feature detection operations such as edge detectors to the warped and fused image data. Feature template matching may comprise pairing detected features to features specified in a template and the number of paired features and/or match scores for paired features may be used to form a decision on recognition. Histogram comparison may comprises computing a histogram of image values in the warped and fused image data and comparing the histogram to a template histogram. Geometrical analysis may comprise detecting regions in the warped and fused image data that have homogeneous image properties.

Alternatively, an object recognition operation may be applied to synthetic aperture images obtained by the described method. Different synthetic aperture images may be provided for different synthetic depths of focus. Object recognition may comprise template matching, feature detection, feature template matching, histogram comparison, geometric analyis etc. applied to one or more of these synthetic aperture images. Template matching may comprise comparing a part of the synthetic aperture image to template image data and using a measure of the difference to form a decision on recognition. Feature detection may comprise applying one or more predetermined types of feature detection operations such as edge detectors to the synthetic aperture image. Feature template matching may comprise pairing detected features of the synthetic aperture image to features specified in a template and the number of paired features and/or match scores for paired features may be used to form a decision on recognition. Histogram comparison may comprises computing a histogram of image values in the synthetic aperture image and comparing the histogram to a template histogram. Geometrical analysis may comprise detecting regions in the synthetic aperture image that have homogeneous image properties.

If an object is recognized in this way in one or more of the synthetic aperture images in a set of such images for different focus depths, the image position (or average image position) of the object may be used as a recognition result for the set of synthetic aperture images. By performing object recognition operation to synthetic aperture images for a plurality of different depths of focus an object may be recognized more reliably than from a single camera image. The synthetic images with reduced focus depth may be used to reduce the effect of objects at other depths, and a plurality of such synthetic images for different depths may be used to reduce the risk that objects will be missed.

Figure 14:
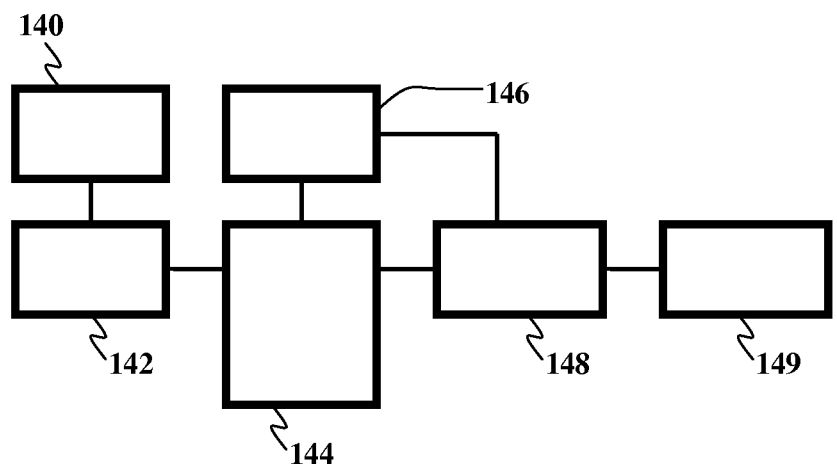
FIG. 14 shows a device for processing a set of images

FIG. 14 shows a device for processing a set of images. The device comprises at least one camera 140, a controller 142, an image storage device 144, a motion estimator 146, a synthetic aperture processor 148 and a display unit 149. Controller 142 is coupled to camera 140 and image storage device 144. Motion estimator has an input coupled to image storage device 144 and an output coupled to an input of synthetic aperture processor 148. Synthetic aperture processor 148 is coupled to image storage device. Display unit 149 is coupled to synthetic aperture processor 148. Instead of display unit 149 or in addition to it, a further processor may be used.

Controller 142 may be a programmable microcontroller circuit for example. Controller 142 is configured to (for example, has a program memory with a program to) actuate said at least one camera to make the images of said set of images from mutual different geometric positions during to movements of the device thus providing an array of subsequent images. The array of images may be recorded in image storage device 144. Motion estimator 146 is configured to estimate the camera movements between subsequent image recordings (also called ego-motion), based on features of those recorded images. Synthetic aperture processor 148 is configured to process the camera images by means of a synthetic aperture method, to provide registration. Motion estimator 146 and synthetic aperture processor 148 may be implemented by means of software modules with program instructions for one or more programmable computers to perform the operations described in the preceding. Controller 142 may also be implemented on these one or more programmable computers. Alternatively, part or all of controller 142, motion estimator 146 and synthetic aperture processor 148 may be implemented by specific logic circuits designed to perform these functions.

A method is provided that may be used for recognizing objects in a set of images recorded by one or more cameras, the images of said set of images being made from mutual different geometric positions. An embodiment of the method comprises the steps of:
  recording a set or subset of images by means of one camera which is moved rather freely and which makes said images during its movement, thus providing an array of subsequent images;
  estimating the camera movement between subsequent image recordings, also called ego-motion hereinafter, based on features of those recorded images;
  registering the camera images using a synthetic aperture method;
  recognizing said objects.

In a further embodiment the images are recorded at different 3D positions, image features are detected, features are matched, camera motion is estimated, a 3D surface is estimated, image transformations to the selected 3-D surface are computed, images are warped to the 3D surface and fusing images are fused to the 3D surface. The results are either displayed or further processed or evaluated and optionally additional images are added or removed.

In an embodiment a device is provided for recognizing objects in a set of images recorded by at least one camera included in the device, control means to actuate said at least one camera to make the images of said set of images from mutual different geometric positions during to movements of the device thus providing an array of subsequent images; the device comprising or being connected to motion estimation means which are arranged for estimating the camera movements between subsequent image recordings, also called ego-motion hereinafter, based on features of those recorded images; the device, moreover, comprising registration means which are arranged for processing the camera images by means of a synthetic aperture method.

In a further embodiment the device comprises at least one camera and control and processing means, arranged to record images of an area from different 3-D positions, detecting image features, matching said features and estimating camera motion; moreover, processing means for selecting a relevant 3-D surface, computing image transformations to the selected 3-D surface, warping images to the 3-D surface, fusing images to the 3-D surface and either displaying, further processing or evaluating the results and optionally add or remove additional images.

In a further embodiment the device is, comprises or is comprised in a handheld device, for example a set of electronic binoculars or a mobile phone with a camera. In another embodiment the device is, comprises or is comprised in a head mounted device, for example a set of, e.g. night-vision, goggles or a head mounted display. In another embodiment the device is, comprises or is comprised in an optical system, that is intended for targeting or aiming, such as a gun scope, bombsight or a target designator. In another embodiment the device is, comprises or is comprised in an observation, reconnaissance or surveillance system that is mounted on a flying platform, such as an unmanned airborne vehicle, airplane or a helicopter. In another embodiment the device is, comprises or is comprised in an observation, reconnaissance or surveillance system that is mounted on a mobile platform, such as a ground vehicle, motorcycle, ship or submarine. In another embodiment the device is, comprises or is comprised in a camera system mounted on a space born system such as a space ship, satellite or a planetary rover. In another embodiment the device is, comprises or is comprised in a remote viewing system, such as a periscope or a telescope. In another embodiment the device is, comprises or is comprised in a camera system that is moved through the 3-D space with a robot manipulator. In another embodiment the device is, comprises or is comprised in an imaging system that are sensitive to the visual, infra-red, ultraviolet or other parts of the electromagnetic spectrum. In another embodiment the device is, comprises or is comprised in a biometric identification system that is used for surveillance, security or access control.

REFERENCES

[1] B. Wilburn, High performance imaging using arrays of inexpensive cameras, PhD thesis, Stanford University, 2005.
[2] R. I. Hartley and A. Zisserman, Multiple View Geometry in Computer Vision, Cambridge University Press, second edition, 2003.
[3] V. Vaish et al, Using plane+parallax for calibrating dense camera arrays, CVPR, 2004
[4] Matting using camera arrays, US2007/0070226.
[5] Method and system for light field rendering, U.S. Pat. No. 6,097,394.
[6] Video matting using camera arrays, US2007/0070200.
[7] Apparatus and method for high dynamic range imaging using spatially varying exposures U.S. Pat. No. 6,864,916.
[8] K. Kanatani. Statistical Optimization for Geometric Computation: Theory and Practice. Dover Publications, ISBN: 0486443086, 1996.
[9] B. C. Matei. Heteroscedastic errors-in-variables models in computer vision. PhD thesis, The State University of New Jersey, May 2001.
[10] D. G. Lowe. Distinctive image features from scale-invariant keypoints. International Journal of Computer Vision, 60(2):91-110, 2004.
[11] P. Ton and D. W. Murray, "The development and comparison of robust methods for estimating the fundamental matrix", International Journal of Computer Vision, Vol. 24, No. 3, pp. 271-300, 1997.
[12] M. A. Fischler and R. C. Bolles. Random sample consensus: a paradigm for model fitting with applications to image analysis and automated cartography. Communications of the ACM, 24(6):381-395, June 1981.
[13] G. Dubbelman, W. van der Mark, and F. C. A. Groen. Accurate and robust ego-motion estimation using expectation maximization. In IEEE/RSJ International Conference on Intelligent Robots and Systems, pages 3914-3920, September 2008.
[14] L. Matthies and S. A. Shafer. Error modeling in stereo navigation. IEEE Journal of Robotics and Automation, 3(3):239-248, June 1988.
[15] Herbert Bay, Andreas Ess, Tinne Tuytelaars, Luc Van Gool, "SURF: Speeded Up Robust Features", Computer Vision and Image Understanding (CVIU), Vol. 110, No. 3, pp. 346-359, 2008
[16] V. Lepetit, P. Lagger and P. Fua, Randomized Trees for Real-Time Keypoint Recognition, Conference on Computer Vision and Pattern Recognition, San Diego, Calif., June 2005.
[17] J. Dijk, "In search of an objective function for the Perceptual Quality of Printed Images", Ph.D. Thesis, Technical University of Delft, Delft, The Netherlands, 23 Mar. 2004.

The invention claimed is:
1. A method for recognizing objects in recorded images, the images being obtained from mutually different geometric positions, the method comprising the following steps:
  recording a set of images by means of a camera which is freely moved and which optically makes said images during its movement, thus providing an array of successive images;
  estimating the camera movement between successive image recordings based on positions of features detected in those recorded images;
  using a synthetic aperture method based on the camera movements to compute synthetic aperture images for focal surfaces at different depths, the synthetic aperture images being computed from the array of successive images, wherein said computing comprises:
  computing respective image transformations from each image of the array of successive images to each of a plurality of respective 3D surfaces, each of the 3D surfaces corresponding to a respective focal surface at a respective depth;
  warping each of the images to each of the 3D surfaces according to the respective image transformations; and computing each of the synthetic aperture images by fusing the images warped to a respective one of the 3D surfaces.

2. A method according to claim any one of claims 1, recognizing an object from a result of the synthetic aperture method.

3. A method according to claim 1, comprising the following steps:
recording the images at mutually different 3D positions;
detecting image features in the images;
matching detected image features from mutually different images;
estimating camera motion from the matched features;
selecting a 3D surface;
computing image transformations from the images to the selected 3D surface;
warping the images to the 3D surface according to the image transformations;
fusing the warped images to the 3D surface and either displaying or further processing or evaluating the results and optionally add or remove additional images.

4. A method according to claim 1, wherein the one camera is a stereo camera, the set of images being a stereo image sequence, the estimation of camera movement comprising detecting relationships between left and right stereo images from a common stereo camera position and tracking features over time through the stereo image sequence.

5. A method according to claim 1, wherein said estimating comprises estimating camera positions relative to the features of those recorded images that are visible in the recorded images, said computing the plurality of synthetic aperture images comprising computing the synthetic aperture image for the respective depths based on the camera positions.

6. A device for recognizing objects in a set of images, the device comprising
a camera for recording a set of images,
a controller configured to actuate said camera to record the images of said set of images obtained optically from mutual different geometric positions during movements of the device, thus providing an array of successive images;
a motion estimator or a connection to a motion estimator arranged to estimate the camera movements between the recorded successive images based on positions of features detected in those recorded successive images;
a synthetic aperture processor arranged to process the camera images by means of a synthetic aperture method to compute synthetic aperture images at different depths, wherein the synthetic aperture images are computed from the array of successive images, wherein said synthetic aperture processor is configured to:
compute respective image transformations from each image of the array of successive images to each of a plurality of respective 3D surfaces, each of the 3D surfaces corresponding to a respective focal surface at a respective depth;
warp each of the images to each of the 3D surfaces according to the respective image transformations; and
compute each of the synthetic aperture images by fusing the images warped to a respective one of the 3D surfaces.

7. A device according to claim 6, wherein the motion estimator is configured to detect image features, match said features and estimate camera motion; the synthetic aperture processor being configured to select a 3-D surface, compute image transformations to the selected 3-D surface, warp images to the 3-D surface, fuse images to the 3-D surface.

8. Device according to claim 6, the device being, comprising or being comprised in a handheld device selected from the group consisting of a set of electronic binoculars and a mobile phone with a camera.

9. Device according to claim 6, the device being, comprising or being comprised in a head mounted device selected from the group consisting of night-vision, goggles and a head mounted display.

10. Device according to claim 6, the device being, comprising or being comprised in an optical system, that is intended for targeting or aiming, selected from the group consisting of a gun scope, bombsight and a target designator.

11. Device according to claim 6, the device being, comprising or being comprised in an observation, reconnaissance or surveillance system that is mounted on a flying platform selected from the group consisting of an unmanned airborne vehicle, airplane and a helicopter.

12. Device according to claim 6, the device being, comprising or being comprised in an observation, reconnaissance or surveillance system that is mounted on a mobile platform selected from the group consisting of a ground vehicle, motorcycle, ship and submarine.

13. Device according to claim 6, the device being, comprising or being comprised in a camera system mounted on a space born system selected from the group consisting of a space ship, satellite and a planetary rover.

14. Device according to claim 6, the device being, comprising or being comprised in a remote viewing system selected from the group consisting of a periscope and a telescope.

15. Device according to claim 6, the device being, comprising or being comprised in a camera system that is moved through the 3-D space with a robot manipulator.

16. Device according to claim 6, the device being, comprising or being comprised in an imaging system that are sensitive to the visual, infra-red, ultraviolet or other parts of the electromagnetic spectrum.

17. Device according to claim 6, the device being, comprising or being comprised in a biometric identification system that is used for surveillance, security or access control.

18. A device according to claim 6, wherein said motion estimator is configured to estimate camera positions relative to the features of those recorded images that are visible in the recorded images, the synthetic aperture processor being configured to compute the synthetic aperture image for the respective focal surface at the respective depth based on the camera positions.

19. A computer, comprising a program of instructions for a programmable processor system that, when executed by the programmable processor system, will cause the programmable processor system to
record a set or subset of images from one camera which is freely moved and which makes said images during its movement, thus providing an array of subsequent images;
estimate the camera movement between subsequent image recordings based on positions of features detected in those recorded images;
use a synthetic aperture method based on the camera movements to compute synthetic aperture images for focal surfaces at different depths, the synthetic aperture images being computed from the array of successive images, wherein the synthetic aperture image computation includes computing respective image transformations from each image of the array of successive images to each of a plurality of respective 3D surfaces, each of the 3D surfaces corresponding to a respective focal surface at a respective depth;
warping each of the images to each of the 3D surfaces according to the respective image transformations; and
computing each of the synthetic aperture images by fusing the images warped to a respective one of the 3D surfaces.

* * * * *